Oct. 3, 1972     J. T. ZELLERS, JR     3,695,861
DRAW POT SKIMMER
Filed June 12, 1970
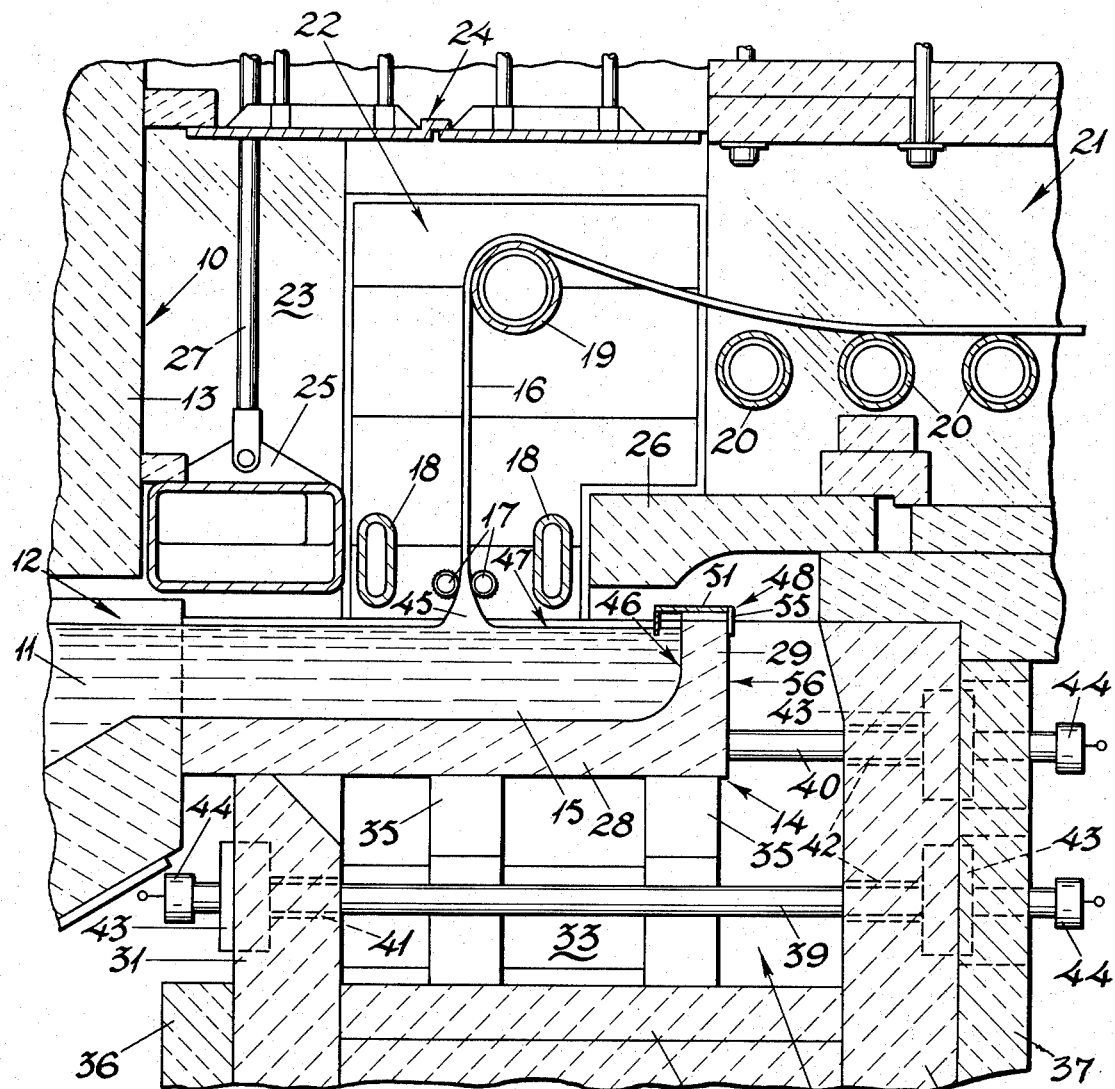
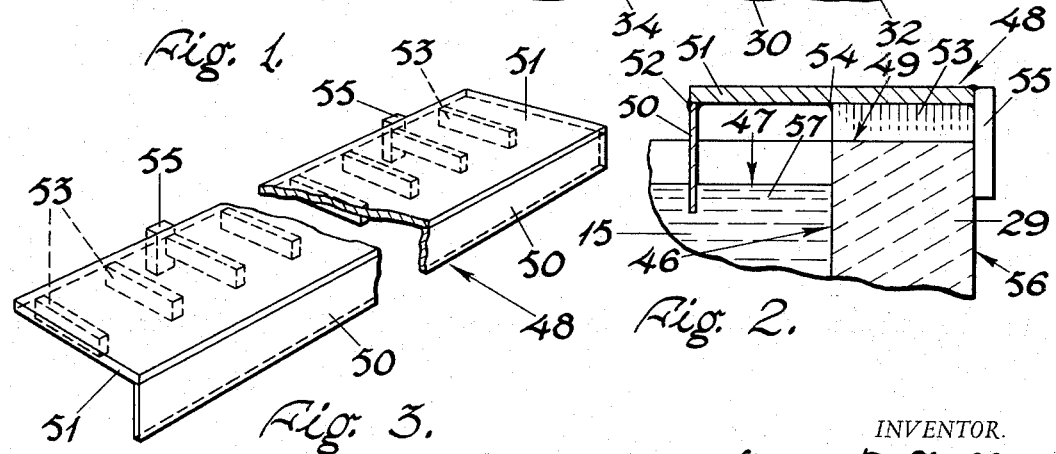
Fig. 1.    Fig. 2.    Fig. 3.
INVENTOR.
James T. Zellers
BY
Collins & Oberlin
ATTORNEYS

United States Patent Office 3,695,861
Patented Oct. 3, 1972

3,695,861
DRAW POT SKIMMER
James T. Zellers, Jr., Charleston, W. Va., assignor to Libbey-Owens-Ford Company, Toledo, Ohio
Filed June 12, 1970, Ser. No. 45,622
The portion of the term of the patent subsequent to Mar. 22, 1977, has been disclaimed
Int. Cl. C03b 5/20
U.S. Cl. 65—206       5 Claims

ABSTRACT OF THE DISCLOSURE

Skimming the surface of the pool of molten glass adjacent the rear wall of the draw pot in an electrically heated, Colburn type sheet glass producing apparatus. An L-shaped skimmer supported upon the rear pot wall includes a vertical leg extending into the pool of molten glass along the length of the rear pot wall parallel to and at a short distance therefrom to trap particles of refractory eroded from the surface of the rear pot wall and prevent the particles from being drawn into the sheet and forming pot lines therein.

BACKGROUND OF THE INVENTION

Field of the invention

The present invention relates broadly to the manufacture of sheet or window glass by the so-called Colburn process and, more particularly, to an improved skimming means for preventing material eroded from the rear wall of the draw pot from entering the sheet.

Description of the prior art

So-called "window" or "sheet" glass, which is flat, drawn glass having fire polished surfaces attained during the formation of the sheet, as opposed to "plate" glass which has mechanically ground and polished surfaces, is conventionally produced by drawing a sheet or ribbon of glass upward from a mass of molten glass and, in accordance with the Colburn process, while in a highly heated, plastic condition, deflecting it over a bending member to achieve a substantially horizontal disposition, and passing the continuous sheet horizontally through an adjacent annealing lehr.

The mass of molten glass from which the sheet is drawn is contained within a refractory lined cavity or draw pot which also defines the bottom of the so-called drawing chamber. As the sheet is drawn, the supply of molten glass is continually replenished from an adjacent cooling chamber (the exit portion of the melting furnace which is in direct communication with one end of the draw pot) within which the temperature of the molten glass is adjusted and stabilized for drawing.

Heaters are located in the pot chamber beneath the draw pot to maintain the temperature equilibrium established in the cooling chamber. Both direct fired gas burners and electric elements have been used for this purpose. The use of gas burners, however, necessitates sealing the opening above the rear wall of the draw pot, which connects the pot chamber with the drawing chamber, to prevent serious defects in the sheet caused by contact with dust laden convection currents generated in the drawing chamber by the extremely turbulent gaseous products of combustion created in the pot chamber. The use of electric heaters, of course, precludes this problem and eliminates the need for the seal.

Open communication between the two chambers has been found to be desirable. By permitting free thermal circulation therebetween and making direct radiation and reflection of heat from adjacent pot chamber and lip-tile surfaces available to the mass of molten glass in the vicinity of the rear pot wall, an improved glass temperature uniformity is achieved, thereby preventing the devitrification associated with cool areas along the rear pot wall and bringing about a material decrease in distortion in the sheet produced therefrom.

This design has not proved entirely satisfactory, however, because of a collateral problem, namely, the undesirable tendency of the ceramic refractory material of the draw pot to gradually dissolve or erode from the rear pot wall. Having a lower density than glass, the eroded refractory material tends to migrate to the surface of the mass of molten glass where it is drawn toward and into the sheet, producing therein serious defects known in the art as pot lines.

This problem may be avoided in conventional gas fired draw pots having a seal between the pot chamber and drawing chamber by means of a dip seal (i.e., a metal bar attached to the existing seal and extending into the molten glass parallel to the rear pot wall which traps the refractory material between the rear wall and the seal). However, with electrically heated draw pots which have no seal over the rear wall, it has heretofore been necessary to scrape the rear pot wall frequently to remove loosened material before the onset of continuous exfoliation. As the glass produced for some time subsequent to such scraping is heavily pot lined and therefore unusable, substantial production loses are incurred.

SUMMARY OF THE INVENTION

According to the present invention, the problem of the formation of pot lines in the sheet associated with the erosion of refractory material from the rear pot wall of electrically heated draw pots having no rear seal is substantially overcome without sacrificing the distinct temperature uniformity advantage realized without the seal. This is accomplished by providing an L-shaped skimmer adapted to rest on the rear pot wall with one leg thereof extending into the pool of molten glass along the wall and spaced a short distance therefrom.

It is, therefore, a primary object of the invention to minimize the formation of pot lines in a glass sheet drawn from a mass of molten glass contained within a refractory draw pot.

Another object of the invention is to provide a skimmer which substantially prevents refractory material eroded from the rear wall of a draw pot having no rear sealing means from being drawn into the sheet.

Further objects and advantages of the invention will become apparent during the course of the following description when taken in connection with the accompanying drawings.

BRIEF DESCRIPTION OF THE DRAWINGS

In the drawings wherein like numerals are employed to designate like parts throughout the same:

FIG. 1 is a longitudinal vertical sectional view through the drawing chamber of a sheet glass furnace embodying the invention;

FIG. 2 is an enlarged, fragmentary sectional view illustrating the area of the skimmer of FIG. 1; and FIG. 3 is an enlarged perspective view of the skimmer rotated 180 degrees on a horizontal plane from FIGS. 1 and 2.

DESCRIPTION OF THE PREFERRED EMBODIMENTS

Referring now to the drawings, and particularly to FIG. 1, there is shown generally at 10 the outlet end of the cooling chamber of a continuous tank furnace in which a mass of molten glass 11 is continually produced, refined and cooled to a proper working temperature. The molten glass 11 flows from the cooling chamber 10 through an opening 12 beneath a cooling chamber end wall 13 into a working receptacle or draw pot 14 to form a relatively shallow pool of molten glass 15 from which a sheet or ribbon 16 is continuously drawn.

Oppositely disposed pairs of knurled rolls 17 continually engage the sheet 16 along either marginal edge to establish and maintain its width. Coolers 18, through which a fluid cooling medium such as water is passed, are arranged in spaced relation to the opposite surfaces of the sheet 16 to effect the desired cooling during the formation thereof. The sheet 16 is drawn vertically upward from the pool of molten glass for a short distance and then deflected about a bending roll 19, while still in a highly heated, plastic condition, to a substantially horizontal disposition, and passed over a series of conveyor rolls 20 through an adjacent annealing lehr, shown in part at 21.

Generally speaking, in drawing machines of this character, the bending roll 19 is located in a drawing chamber 22, adjoining the lehr 21 and defined by furnace end wall 13, spaced sidewalls 23 and a roof 24.

Arranged above the pool of molten glass at opposite sides of the sheet and beyond the coolers are the cover or lip tiles 25 and 26. Thus, a so-called "front" lip-tile 25 is positioned above the entry end of the draw pot, relatively close to the furnace exit wall 13, and supported by rods 27. The other so-called "rear" lip-tile 26 is situated in spaced relation to and above the rear of the draw pot 14 and may be supported by pipes extending out through the furnace sidewall (not shown).

The draw pot 14 itself has a floor 28, rear wall 29 and spaced sidewalls (not shown) and is generally mounted within a substantially closed ceramic refractory lined pot chamber 30 which has a forward wall 31, a rear wall 32, opposite spaced sidewalls 33 and a bottom wall or floor 34. Stools 35 for supporting the draw pot 14 are generally arranged in transverse and equally spaced parallel relation on the floor 34. Heat losses from the pot chamber walls are further reduced by providing a outer layer of insulating refractory material, shown in part at 36 and 37, which at the same time prevents cooling of the inner wall surfaces, thereby promoting temperature uniformity within the pot chamber 30.

The pot chamber is heated by a series of electrical heating elements 39 mounted in spaced parallel relation and spanning the distance between the front wall 31 and the rear wall 32 on a substantially horizontal plane. Normally, an additional element 40 is similarly situated at a higher elevation along either side of the draw pot 14 to compensate for upper wall thermal losses. The heating elements are received in aligned openings 41 and 42 provided in walls 31 and 32, respectively. At its outer end each of the openings 41 and 42 is formed with an enlarged annular counterbore or recess in which is received a refractory collar 43 adapted to support the heating element in axially spaced relation to the wall of the opening. At their opposite ends, the heating elements 39 and 40 are provided with connector couplings 44 by which they are connected in circuit with a controlled source of electrical energy.

Although not part of the present invention, typically, the temperature within the pot chamber is controlled automatically in reference to temperature measurement by one or more thermocouples mounted in the chamber (not shown). Also, provision is normally made in the circuitry for some degree of individual element adpustment to overcome localized deviations.

As the sheet 16 is drawn from the mass of molten glass 15, glass must be continuously supplied at the meniscus 45 through which the sheet is drawn from both the front and rear directions. While glass from the cooling chamber flows directly into the draw pot to replenish that drawn into the front surface of the sheet through the meniscus, in response to the continual depletion of glass from the region rearward of the meniscus, a continuous general flow pattern develops within the pool of molten glass 15 in which glass in the lower portion of the pool flows in a generally horizontal direction toward the rear pot wall 29, upward therealong, and returns across the surface of the molten mass 15 toward the meniscus 45 to replace the glass drawn from this region. This results in the substantial eroding and loss of the refractory material comprising the inner surface 46 of the rear pot wall 29, mentioned above, with the eroded material tending to the surface of the pool of molten glass 15 at 47 (FIG. 2); and, if unhindered, such material is carried by the general flow of glass and is eventually drawn into the sheet forming longitudinal streaks therein.

The present invention contemplates a skimming device which prevents such eroded material from reaching the meniscus and being drawn into the sheet without sacrificing the distinctly improved temperature uniformity achieved by the open communication between the drawing chamber and pot chamber as discussed above.

To this end, an essentially L-shaped skimmer, indicated generally at 48, is mounted on the top surface 49 of the rear pot wall 29. The metallic skimmer of the invention has a continuous vertical plate 50 which spans the width of the draw pot 14 and is fixed to a horizontal plate 51 of the same length, as by continuous welds at 52. The horizontal plate 51, in turn, is fixed to and supported on a series of spaced horizontal support bars 53 as by means of welding at 54. The bars 53 rest on the surface 49 and along with plate 51 are of a heavier gauge than plate 50 to provide a stable base and prevent tipping of the skimmer into the draw pot. Spaced vertical bars 55 fixed to the plate 51 also aids stability and when positioned against the outer surface 56 of the wall 29 assure proper alignment of the skimmer in relation to the wall 29.

The height of the vertical bar 50 is such that when the skimmer is in place (FIG. 2), the bar dips into the pool of molten glass 15 at a short distance from and parallel to the inner wall surface 46. A pocket of molten glass 57 is thus maintained between the bar 50 and the wall surface 46. As explained above, in this vicinity the general flow within the molten glass 15 is upward along the wall surface 46 and across the surface of the pool of molten glass 15 toward the rear of the mentiscus 45. Therefore glass flows into the pocket 57 from below and is forced to thereafter flow downward around the plate 50 before proceeding onward toward the meniscus 45. However, the refractory material eroded or exfoliated from the rear pot wall surface 46, having a lower density than the glass, floats to the surface of the pocket 57 and is trapped behind the plate 50. Thus the molten glass flowing downward around the plate 50 is rendered relatively free of the refractory contaminants.

From time to time the skimmer must be lifted and the trapped material removed. However, the interval may be several weeks and constitutes a vast improvement over the daily scrapings of the prior art. Also the area above the rear pot wall 29 is left substantially open allowing free thermal radiation and convection communication between the chambers. In addition, the metallic nature of the skimmer 48 provides additional conduction from the surrounding controlled environment directly into the pool of molten glass 15 through the skimmer plate 50 to assist in preventing devitrification along the rear wall 29.

Although the skimmer may be constructed of any materials suitable for the environment, in one successfully used embodiment, the plate 50 is made of Hoskins alloy 875, manufactured by the Hoskins Manufacturing Co. of Detroit, Mich. This alloy is of the following approximate analysis: chromium, 22.5%; aluminum, 5.5%; silicon 0.5%; carbon 0.1%; iron, balance. The remaining plates 51 and bars 53 and 55 are of a suitable stainless steel.

Spacing of the plate 50 from the end wall in the mass of molten glass 15 may vary under different operating conditions. By way of example, successful operation has been achieved with the plate 50 located as little as ½ to ¾ inch away from the wall 29 and extending to a depth of 1 to 1½ inches into the mass of molten glass 15. It may also be found desirable to locate it some distance from the end wall, as much as several inches, under certain operating conditions.

I claim:

1. In apparatus for the continuous production of sheet glass including a draw pot in which a supply of molten glass is maintained, said draw pot including a rear wall and oppositely disposed sidewalls, a substantially enclosed drawing chamber above and in communication with said draw pot, a lip-tile extending across said draw pot above said rear wall, a pot chamber beneath said draw pot and extending upward along the exterior of said rear wall and communicating with said drawing chamber above said rear wall, and electric heating means in said pot chamber for heating the molten glass in said draw pot, the improvement comprising a generally L-shaped skimming means including a horizontally disposed leg supported on said rear pot wall and defining with said lip-tile an opening through which said pot chamber communicates with said drawing chamber, and a vertically disposed leg depending from said horizontal leg extending parallel to said rear pot wall and spaced therefrom, said vertically disposed leg extending downwardly into said molten glass forming a pocket between said rear wall and said vertically disposed leg for entrapping refractory material eroded from said rear wall.

2. Apparatus for the continuous production of sheet glass as claimed in claim 1, wherein said means supporting said horizontal leg on said rear pot wall comprises a plurality of horizontal bars spaced along and affixed to the underside of said horizontal leg and spaced vertical bars fixed to said horizontal leg opposite said vertically disposed leg which extend downward a short distance along said outer wall to position and align said skimmer with respect to said wall.

3. Apparatus for the continuous production of sheet glass as claimed in claim 1, wherein said skimmer extends substantially along the entire length of said rear pot wall.

4. Apparatus for the continuous production of sheet glass as claimed in claim 1, wherein said vertically disposed leg is positioned at a distance of at least ½ inch from the inner surface of said rear pot wall and extends to a depth of at least 1 inch into the mass of molten glass.

5. Apparatus for the production of sheet glass as claimed in claim 2, wherein said vertical leg is formed of an alloy containing about 22.5% chromium, 5.5% aluminum, 0.5% silicon, 0.1% carbon and the balance iron, and said remaining parts are formed of stainless steel.

References Cited
UNITED STATES PATENTS

| | | | |
|---|---|---|---|
| 3,241,940 | 3/1966 | Zellers, Jr. | 65—203 |
| 3,397,975 | 8/1968 | Irland | 65—203 X |

ARTHUR D. KELLOGG, Primary Examiner

U.S. Cl. X.R.

65—203, 338